United States Patent [19]
Sundaresan

[11] Patent Number: 5,991,764
[45] Date of Patent: *Nov. 23, 1999

[54] DATA STRUCTURE SPECIFYING DIFFERING FAN-IN TREE AND FAN-OUT TREE COMPUTATION PATTERNS SUPPORTING A GENERIC REDUCTION OBJECT FOR DATA PARALLELISM

[75] Inventor: Neelakantan Sundaresan, San Jose, Calif.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/815,234

[22] Filed: Mar. 12, 1997

[51] Int. Cl.$^6$ ........................................................ G06F 15/63
[52] U.S. Cl. .............................. 707/102; 707/3; 707/100; 395/731; 395/800.09; 395/800.28
[58] Field of Search .................................... 707/101, 102, 707/103, 3, 100; 395/800.13, 800.09, 800.32, 800.14, 800.28, 731

[56] References Cited

U.S. PATENT DOCUMENTS

| | | | |
|---|---|---|---|
| 4,344,134 | 8/1982 | Barnes | 395/800.16 |
| 4,347,498 | 8/1982 | Lee et al. | 340/825.02 |
| 4,843,540 | 6/1989 | Stolfo | 395/800.11 |
| 4,845,744 | 7/1989 | Debenedictis | 379/221 |
| 4,860,201 | 8/1989 | Stolfo et al. | 395/800.11 |
| 5,230,047 | 7/1993 | Frey, Jr. et al. | 395/182.02 |
| 5,404,521 | 4/1995 | Murray | 395/674 |
| 5,535,393 | 7/1996 | Reeve et al. | 395/706 |
| 5,721,921 | 2/1998 | Kessler et al. | 395/672 |
| 5,764,993 | 6/1998 | Shindo | 395/709 |
| 5,781,906 | 7/1998 | Aggarwal et al. | 707/102 |

OTHER PUBLICATIONS

Olson, "Connectionist Networks for Feature Indexing and Object Recognition", IEEE, pp. 907–912, 1996.

Zang et al. "On the Parallel Complexity of Model Checking in the Modal Mu–Calculus", IEEE, pp. 154–163, 1994.

Halstead, Robert H., Jr. *Multilisp: A Language for Concurrent Symbolic Computation*. ACM Transactions on Programming Languages and Systems, vol. 7, No. 4, pp. 501–538, Oct. 1985.

(List continued on next page.)

*Primary Examiner*—Jean R. Homere
*Attorney, Agent, or Firm*—Prentiss W. Johnson

[57] ABSTRACT

A data structure supporting a data-parallel reduction operation performed by a group of threads, a rope, participating in a multi-level two-phase tree structure: a fan-in computation phase followed by a fan-out broadcast phase. Local reductions are performed at each subtree during the fan-in phase, and the final reduced value is broadcast to all the threads during the fan-out phase. As the reduction operation is a data-parallel operation, the reduction operation is rope specific and is provided by the use of a parallel computation skeleton defined by the data structure which is a fan-in followed by the fan-out, a data-type specific binary operation, and a final broadcast that takes place in the reduction operation. When the rope object is constructed, the parallel computation skeleton is automatically constructed from information contained in the data structure. When a reduction operation is invoked, this parallel computation skeleton is used to build a data-type specific reduction object which is used by all the threads in the rope. The threads in a rope may perform type-specific reduction operations by cloning this parallel computation skeleton to a data-type specific reduction object for that type. This data-type specific reduction object is an instance of a template instance which is parametrized on two data-types: a data-type of the values used in the reduction operation and a type of a binary operation function object.

6 Claims, 7 Drawing Sheets

OTHER PUBLICATIONS

Yokote, Yasuhiko. *The Design and Implementation of Concurrent Smalltalk*, World Scientific Series in Computer Science, vol. 21 1990.

Leddy, William J., and Smith, K. Stuart, *The Design of the Experimental Systems Kernel*. Proceedings of the Fourth Conference on Hypercubes, Concurrent Computers and Applications, Monterey, CA, 1989, pp. 737–743.

Liskov, Barbara and Shrira, Liuba. *Promises: Linguistic Support for Efficient Asynchronous Procedure Calls in Distributed Systems*. Proceedings of the SIGPLAN'88 Conference on Programming Language Design and Implemetation, Atlanta, Georgia pp. 260–267, Jun. 1988.

Reppy, John H., *Concurrent ML: Design, Application and Semantics*, Concurrent ML Manual. AT&T Bell Laboratories, Feb. 1993, Version 0.9.8.

Grimshaw, Andrew S. *Easy–to–use Object–Oriented Parallel Processing with Mentat*. IEEE Computer, pp. 39–51, May 1993.

Lavender, R. Greg and Kafura, Dennis G., *A Polymorphic Future and First–class Function Type for Concurrent Object–Oriented Programming*, Sponsored in part by National Science Foundation grant CCR–9104013.

Callahan, David and Smith, Burton. *A Future–based Parallel Language For a General–purpose Highly–parallel Computer*. Tera Computer Company, 400 N. 34th Street, Suite 300, Seattle, WA 98103, ARPA Order No. 6512, Program Code No. E20 issued by DARPA/CMO under Contract # MDA972–89–C–0002 and Sponsored by the Defense Advanced Reseach Projects Agency Information Science and Technology Office.

Sheffler, Thomas J., *The Amelia Vector Template Library*, Parallel Programming Using C++, Scientific & Engineering Computation Series, 1996, pp. 43–89.

```
                    Reduction tree class
class FanInNode {
    public:
        typedef short fanin_size_type;
        enum {fanin_size = sizeof(fanin_size_type) };
        Boolean ith_fanin_child_exists(const int i) const;
        ...
};
class FanOutNode {
    public:
        typedef int fanout_size_type;
        enum {fanout_size = sizeof(fanout_size_type) };
        Boolean ith_fanout_child_exists(const int i) const;
        ...
};
class Reduction {
    public:
        struct FanInOutNode : public FanInNode, public FanOutNode {
            ...
        };

typedef FanInOutNode node_type;

Reduction(const int size); // constructor
        virtual ~Reduction();      // destructor
        int Size() const; //number of threads participating in a reduction
        node_type& get_node(const int i); // get node of the ith thread
        static int fanin_parent(const int i); //get the fan-in parent of the ith thread
        static int fanout_parent(const int i); //get the fan-out parent of the ith thread
        static int fanout_child(const int i, const int k); //get the kth fan-out child of ith thread
        static int fanin_child(const int i, const int k); //get the kth fan-in child of ith thread
    private:
        node_type * nodes;
        int_size;
        const int STAGGER_FACTOR = 128;
};
```

FIG. 3

```
                    ReductionT template class
         505                   510                520
template <class T, class ReducerType : binary_function<T, T, T>>
class ReductionT {
public:                        535
        typedef ReducerType reducer_type;
        typedef T data_type; ~ 540
525 ~ ReductionT(Reduction& my_red = Rope::SelfRope().ReductionObj());
        ~ReductionT();         ~ 530
545 ~ T operator()(reducer_type reducer, const T& data);
        };                          550           555
};
```

```
Example of User Code
...
ReductionT<int, binary_funtion<int, int, int> > red_obj(Rope::SelfRope().ReductionObj());
int my_contrib = ...
int my_sum = red_obj(plus<int>, my_contrib);    // sum reduction
int my_prod = red_obj(times<int>, my_contrib);  // product reduction
```

DATA STRUCTURE SPECIFYING DIFFERING FAN-IN TREE AND FAN-OUT TREE COMPUTATION PATTERNS SUPPORTING A GENERIC REDUCTION OBJECT FOR DATA PARALLELISM

CROSS-REFERENCE TO RELATED APPLICATIONS

Application Ser. No. 08/815,231, filed concurrently herewith on Mar. 12, 1997 for A METHOD OF, SYSTEM FOR, AND ARTICLE OF MANUFACTURE FOR PROVIDING A GENERIC ADAPTOR FOR CONVERTING FROM A NON-FUTURE FUNCTION POINTER TO A FUTURE FUNCTION OBJECT currently co-pending, and assigned to the same assignee as the present invention;

Application Ser. No. 08/820,393, filed concurrently herewith on Mar. 12, 1997 for A METHOD OF, SYSTEM FOR, AND ARTICLE OF MANUFACTURE FOR PROVIDING A GENERIC REDUCTION OBJECT FOR DATA PARALLELISM, currently co-pending, and assigned to the same assignee as the present invention; and Application Ser. No. 08/820,394, filed concurrently herewith on Mar. 12, 1997 for A METHOD OF, SYSTEM FOR, AND ARTICLE OF MANUFACTURE FOR PROVIDING A GENERIC ADAPTOR FOR CONVERTING FROM A SEQUENTIAL ITERATOR TO A PER-THREAD PARALLEL ITERATOR, currently co-pending, and assigned to the same assignee as the present invention.

The foregoing copending applications are incorporated herein by reference.

A portion of the Disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to the fields of generic programming and parallel programming, and more particularly to a generic reduction object for data parallelism.

2. Description of the Related Art

Parallel Programming Reduction Operation

Parallel programming or parallel processing is a method of processing that executes on a computer containing two or more processors running simultaneously. A primary objective of parallel processing is dividing a task so that it may be distributed among the available processors. A parallel reduction operation or reduction operation is an operation that reduces N values distributed over N tasks using a commutative associative operator. For example, a summation reduction operation sums N values distributed among N tasks. Reduction operators include sum and product, maximum and minimum, logical AND, OR, and EXCLUSIVE OR and bitwise AND, OR, and EXCLUSIVE OR.

The state of the prior art in parallel reduction operations is represented by MPI (Message Passing Interface), a standard portable message-passing library definition developed in 1993 and available for a wide variety of parallel machines for both Fortran and C programs. The facilities in MPI for performing a reduction operation include MPI_REDUCE and MPI_ALLREDUCE to perform the actual reduction operation, and MPI_SCATTER and MPI_ALLTOALL for broadcasting values to be reduced to the tasks participating in the reduction operation. To perform a reduction operation reducing N values distributed over N tasks, MPI_SCATTER may be used to broadcast the values from a single root task to the N tasks in a group such that each of the N tasks receives one of the values. MPI_REDUCE may then be used to perform the reduction operation across all N tasks in the group and place the result, the single reduced value, in the root task. The reduction computation pattern of these facilities is only a simple single level fan-out tree, one root node with N leaf nodes, followed by a simple single level fan-in tree, one root node with N leaf nodes. Alternatively, MPI_ALLTOALL may be used in the fan-out broadcast to distribute values from each of the N nodes to each of the other N-1 nodes; however, again this broadcast pattern is merely a parallel set of N simple single level fan-out trees. An alternative reduction operation is MPI_ALLREDUCE which perform the reduction operation across all N tasks in the group and distributes the result, the single reduced value, to all N tasks in the group; however, again this broadcast pattern is merely a parallel set of N simple single level fan-in trees. Such limited reduction computation patterns fail to allow a user to specify a reduction computation pattern, how the reduction operation is to be performed. MPI also fails to provide a type-specific reduction, a reduction specific for a particular data type. MPI is also not a multi-threaded implementation, and thus fails to provide a multi-threaded reduction operation.

Another system representative of the prior art is the Amelia Vector Template Library (AVTL); however, it also fails to provide a multi-threaded reduction operation and fails to provide a capability for specifying how a reduction operation is to be performed.

Thus prior art systems fail to provide a complex reduction computation pattern, a capability of specifying a reduction computation pattern, or a multi-threaded implementation of a reduction operation, and as such there is a need for a type-specific, multi-threaded reduction operation performing user specified complex reduction computation patterns.

Generic Programming

In addition to the above limitations, the prior art has failed to provide generic reduction operation facilities. Generic programming provides a paradigm that abstracts concrete, efficient algorithms that may be combined with different data representations to produce a wide variety of useful software. Given N data types, M containers, and K algorithms as components of a software system, the generic programming paradigm [4] provides a mechanism to reduce the possibly $N^*M^*K$ implementations to N+M+K implementations. The Standard Template Library (STL) [3, 5] is an implementation of this paradigm in C++. For instance, using this paradigm, a generic sorting algorithm can be instantiated to work with different aggregate data structures like linked lists or arrays. Originally developed in Ada and Scheme, such a library has been recently implemented in C++ and Java. Called the standard template library or STL, this library has been adopted by the C++ ANSI standard committee.

The Standard Template Library

The standard template library implements the four abstractions of generic programming, data, algorithmic, structural, and representational, as a container class library in C++.

Data Abstractions

Data abstractions are data types and sets of operations on them. These are implemented as containers or template classes in C++. Templates or parameterized types in C++ provide a uniform interface and implementation abstractions for different data types. For instance, a template stack class may be instantiated to a stack of integers, a stack of doubles, or a stack of any user-defined type. Thus, for N data types only one template container class is provided which may be instantiated N ways.

Algorithmic Abstractions

Algorithmic abstractions are families of data abstractions with a common set of algorithms, known as generic algorithms. For instance, a sort algorithm could work on a linked list or a vector data abstraction. Algorithmic abstractions are implemented as template functions in C++, and are typically parameterized over iterators or structural abstractions.

Structural Abstractions

Structural abstractions are defined with respect to algorithmic abstractions. Structural abstractions are data types defined by data abstractions over which algorithmic abstractions may be instantiated. These structural abstractions are implemented as iterators in STL, and are data type templates exported by container classes. Algorithm templates work over iterators rather than directly over containers; therefore, a same algorithm template may be instantiated for different container instantiations. An iterator may be of one of the following kinds: input, output, forward, backward, or random-access. There are interfaces, depending on the kind of the iterator, that enable referencing and traversing data abstractions. The referencing operator is an overloaded * operator which returns the value at the position pointed to by the iterator. This operator may be used to read or write in an assignment expression the data pointed to by the iterator. Traversal operators include ++ (auto-increment), -- (auto-decrement), +n (jump n positions forward), and -n (jump n positions backward).

Representational Abstractions

Representational abstractions are mappings from one structural abstraction to another. Representational abstractions are known as adaptors in STL, and are casting wrappers that change the appearance of a container (building a stack from a list), or change the appearance of an iterator (converting a random-access iterator to a bidirectional iterator).

Despite the above developments and benefits of generic programming, it has failed to recognize the need for or provide a solution of a generic reduction object or a generic reduction computation pattern object for data parallelism. As such, there is a need for a method of, apparatus for, and article of manufacture for providing a generic reduction object and a generic reduction computation pattern object for data parallelism.

SUMMARY OF THE INVENTION

The invention disclosed herein comprises a method of, a system for, and an article of manufacture for providing a generic reduction object for data parallelism. In the practice of the present invention, a data-parallel reduction operation is performed by a group of threads or a rope participating in a multi-level two-phase tree structure: a fan-in computation phase followed by a fan-out broadcast phase. A rope is a group of threads performing a same computation, but on possibly different data components. Local reductions are performed at each subtree during the fan-in phase, and a final reduced value is broadcast to all the threads during the fan-out phase. As the reduction operation is a data-parallel operation, the reduction operation is rope specific and is provided by the use of a parallel computation skeleton defined by the data structure which is a fan-in followed by the fan-out, a data-type specific binary operation, and a final broadcast that takes place in the reduction operation. When the rope object is constructed, the parallel computation skeleton is automatically constructed from information contained in the data structure. When a reduction operation is invoked, this parallel computation skeleton is used to build a data-type specific reduction object which is used by all the threads in the rope. The threads in a rope may perform type-specific reduction operations by cloning this parallel computation skeleton to a data-type specific reduction object for that type. This data-type specific reduction object is an instance of a template instance which is parametrized on two data-types: a data-type of the values used in the reduction operation and a type of a binary operation function object.

In accordance with one aspect of this invention, a multi-threaded reduction operation is provided.

In accordance with another aspect of this invention, a data structure containing a user-specified reduction computation pattern is provided.

In accordance with another aspect of this invention, a user-specified reduction computation pattern is provided.

In accordance with another aspect of this invention, the generic reduction object is an instance of a type-specific reduction template class.

In accordance with another aspect of this invention, the type-specific reduction template class is a subclass of a parent class which is a function object being reduced.

In accordance with another aspect of this invention, a type-specific reduction object is an object instance of an instantiation of a type-specific reduction template.

In accordance with another aspect of this invention, the type-specific reduction template class is parametrized on a type of an function object being reduced and on a data type to which a result of the function object is convertible.

In accordance with another aspect of this invention, the type-specific reduction template class exports the type of the function object being reduced and the data type to which the result of the function object is convertible.

In accordance with another aspect of this invention, the type-specific reduction template class exports a constructor which takes an argument of a reduction tree skeleton object.

In accordance with another aspect of this invention, the reduction tree skeleton object contains a data structure specifying a computation pattern of reduction operations performed by a plurality of threads.

In accordance with another aspect of this invention, an ( ) operator takes as arguments a binary commutative and associative function object used in the reduction operation and a contribution of a thread to the reduction operation.

In accordance with another aspect of this invention, each thread participating in the reduction operation invokes the ( ) operator while in a data-parallel computation.

In accordance with another aspect of this invention, each thread participating in a data-parallel reduction operation, obtains the reduction tree skeleton object corresponding to this thread's rope; creates a type-specific per-thread reduction object for each type T for which the data-parallel reduction operation is to be performed; and invokes the '( )' operator of the reduction tree skeleton object for each reducer comprising a binary commutative and associative operator for type T.

The present invention has the advantage of providing a multi-threaded reduction operation.

The present invention has the advantage of providing one reduction template per rope, where a rope operation may interleave with other rope operations, thus allowing reduction operations to interleave across rope operations.

The present invention has the advantage of separating a reduction object template and type-specific reduction object from the actual reduction operation, thus allowing the same reduction skeleton object to be used for all reduction operations within a rope, and also allowing a type-specific reduction object, once created, to be reused for different reduction operations of the same type.

The present invention has the advantage of providing a reduction computation pattern that is independent of the data types of the values contributed to the reduction computation.

The present invention has the advantage of providing a reduction computation pattern that is independent of the types of the reduction operator of the reduction computation.

The present invention has the advantage of providing a reduction tree skeleton and reduction computation pattern that is reusable for different types of reduction operators.

The present invention has the advantage of providing a reduction computation pattern whose fan-out and fan-in patterns may be different.

The present invention has the advantage of providing a data structure specifying such a reduction computation pattern.

The present invention has the advantage of providing improved parallelization of sequential code.

The present invention has the further advantage of improving expressibility of parallel code.

The present invention has the further advantage of improving maintenance of parallel code.

The present invention has the further advantage of improving reuse of sequential code and parallel code.

BRIEF DESCRIPTION OF THE DRAWINGS

For a more complete understanding of the present invention and the advantages thereof, reference is now made to the Detailed Description in conjunction with the attached Drawings, in which:

FIG. 3 illustrates a reduction tree class definition in accordance with the present invention;

DESCRIPTION OF THE PREFERRED EMBODIMENT

Figure 1:
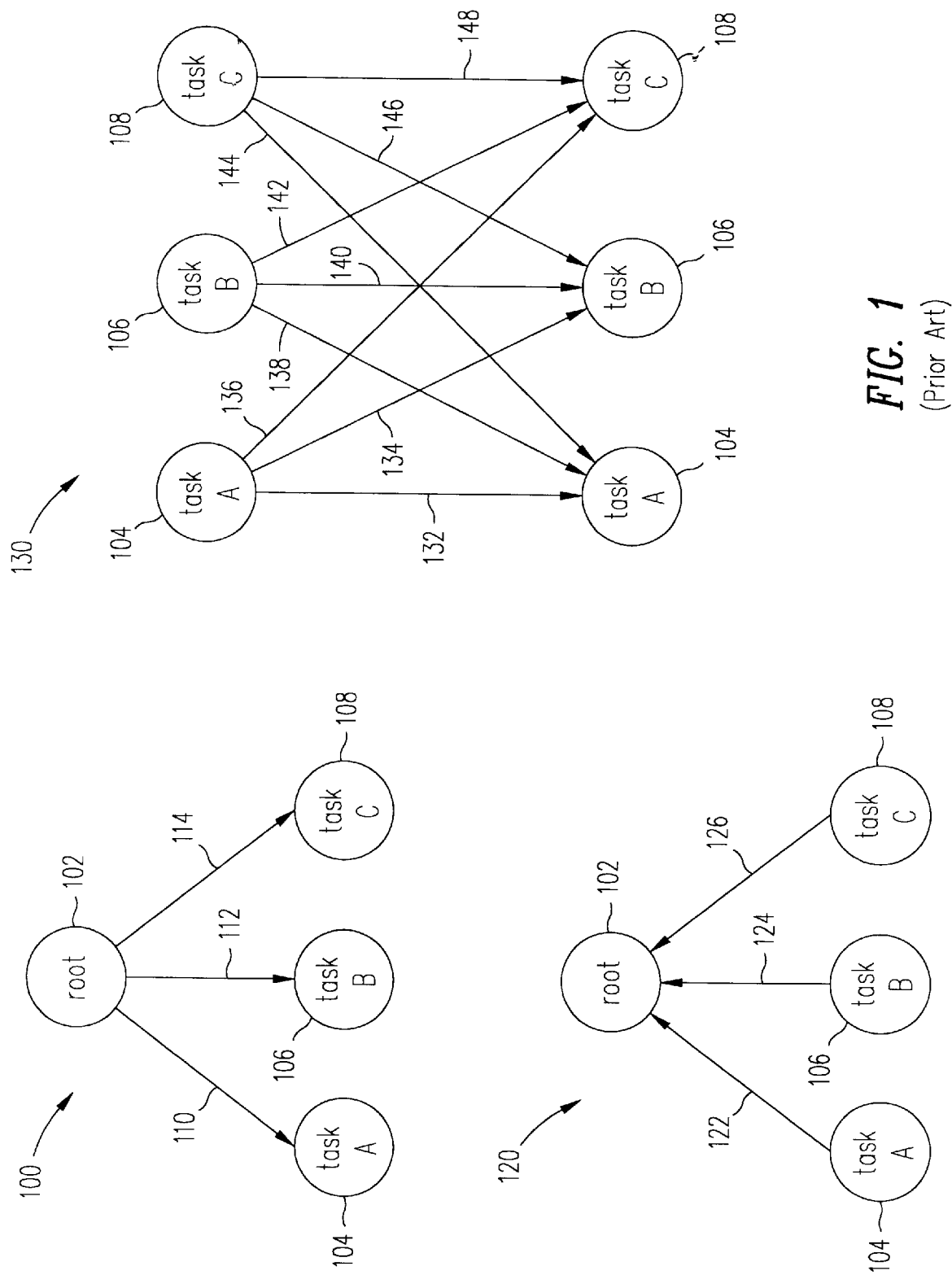
FIG. 1 illustrates reduction tree skeletons in accordance with the prior art.

To more fully appreciate various aspects and benefits of the present invention, FIG. 1 illustrates reduction operations in accordance with the prior art. To perform a reduction operation reducing three values distributed over three tasks with a prior art system such as MPI, MPI_SCATTER 100 broadcasts the values from a single root task 102 to the three tasks (task A 104, task B 106, and task C 108) in the group such that each of the three tasks 104, 106, and 108 receives one of the values. MPI_SCATTER 100 broadcasts the values in a fan-out pattern comprising a single level tree structure comprising root node 102 to leaf nodes 104, 106, and 108 through communications 110, 112, and 114.

In a similar manner, MPI_REDUCE 120 performs the reduction operation across all three tasks 104, 106, and 108 in the group and places the result, the single reduced value, in the root task 102. MPI_REDUCE 120 gathers the reduced value in a fan-in pattern comprising a single level tree structure comprising leaf nodes 104, 106, and 108 to root node 102 through communications 122, 124, and 126. The reduction computation patterns of both the broadcast fan-out of MPI_SCATTER 100 and the gathering fan-in of MPI_REDUCE 120 are limited to a simple single level tree, one root node with N leaf nodes.

Alternatively, MPI_ALLTOALL 130 may be used in a fan-out broadcast to distribute values from each of the three nodes 104, 106, and 108 to each of the three nodes 104, 106, and 108. However, again this broadcast pattern is merely a parallel set of three simple single level fan-out trees. Node 104 broadcasts the values in a fan-out pattern comprising a single level tree structure comprising root node 104 to leaf nodes 104, 106, and 108 through communications 132, 134, and 136. Node 106 broadcasts the values in a fan-out pattern comprising a single level tree structure comprising root node 106 to leaf nodes 104, 106, and 108 through communications 138, 140, and 142. Node 108 broadcasts the values in a fan-out pattern comprising a single level tree structure comprising root node 108 to leaf nodes 104, 106, and 108 through communications 144, 146, and 148. Similarly, MPI_ALLREDUCE in the performance of a reduction operation across the three nodes 104, 106, and 108 gathers and distributes the reduced value to all three N tasks 104, 106, and 108 using the same broadcast pattern of three parallel simple single level fan-in trees: a first tree comprising 123, 134, and 136; a second tree comprising 138, 140, and 142; and a third tree comprising 144, 146, and 148.

Referring next to FIG. 2 through FIG. 8, class templates, code listings, a class inheritance hierarchy diagram, and an execution graph illustrating operations preferred in carrying out the present invention are shown. The conventions used in these Figures are well understood by those skilled in the art, and the Figures are sufficient to enable one of ordinary skill to write code in any suitable computer programming language.

Multi-threaded Data-Parallelism

The present invention provides multi-threaded data-parallelism through the use of groups of threads known as ropes. Data parallelism means each thread in the rope performs the same computation, but on possibly different data component. The preferred embodiment of the present invention provides the following rope related operations:

Rope& Rope::SelfRope( )—identify the currently executing rope;

int Rope::Size( )—number of threads in a rope;

int Rope:: SelfIndex( )—index of the currently executing thread in the thread's rope;

int Rope::Index(const Thread& thr)—index of the thread "thr" in its rope;

Thread& operator[ ](const int index)—the index$^{th}$ thread in the rope; and

Reduction& ReductionObj( )—the reduction operation skeleton which specifies the computation pattern of the reduction operation of the rope.

Reduction

The present invention provides data-parallelism through a reduction operation where each thread contributes a value, and the values are reduced using a function to obtain and return a reduced value to each of the threads. The reduction operation itself is a parallel operation that can be done with O(logN) complexity using a tree-style operation. There are three aspects to reduction by the present invention:

The data types of the individual values contributed by each of the threads;

The computation pattern of the reduction operation; and

The reduction operator or function that is used to reduce the values.

The reduction operator or function is an associative function, i.e., $f(f(x,y),z)=f(x, f(y,z))$. The reduction computation pattern is independent of the data types of the values contributed by the threads. The reduction computation pattern depends on the degree of parallelism that is available in terms of the number of processors and threads. Tree reduction computation patterns are effective in reducing parallel complexity. However, performing a reduction operation with a tree reduction computation pattern in parallel may demand that the reduction operator not only be associative but also be commutative, i.e., $f(x,y)=f(y,x)$.

The inventor has discovered that since the reduction computation pattern is independent of the data type of the values and the data type of the reduction operator, a reduction computation pattern skeleton may be built at the time of rope creation. This reduction computation pattern skeleton may then be used and reused for different reduction operations.

The present invention provides a reduction computation pattern with the following properties:

Reduction operations are rope-specific. Thus, reduction operations belonging to different ropes are non interfering.

Different reduction operations within the same rope are non-interfering. This is ensured by defining a reduction computation pattern skeleton comprising two trees, a fan-in tree and a fan-out tree.

Reduction Skeleton

Figure 2:
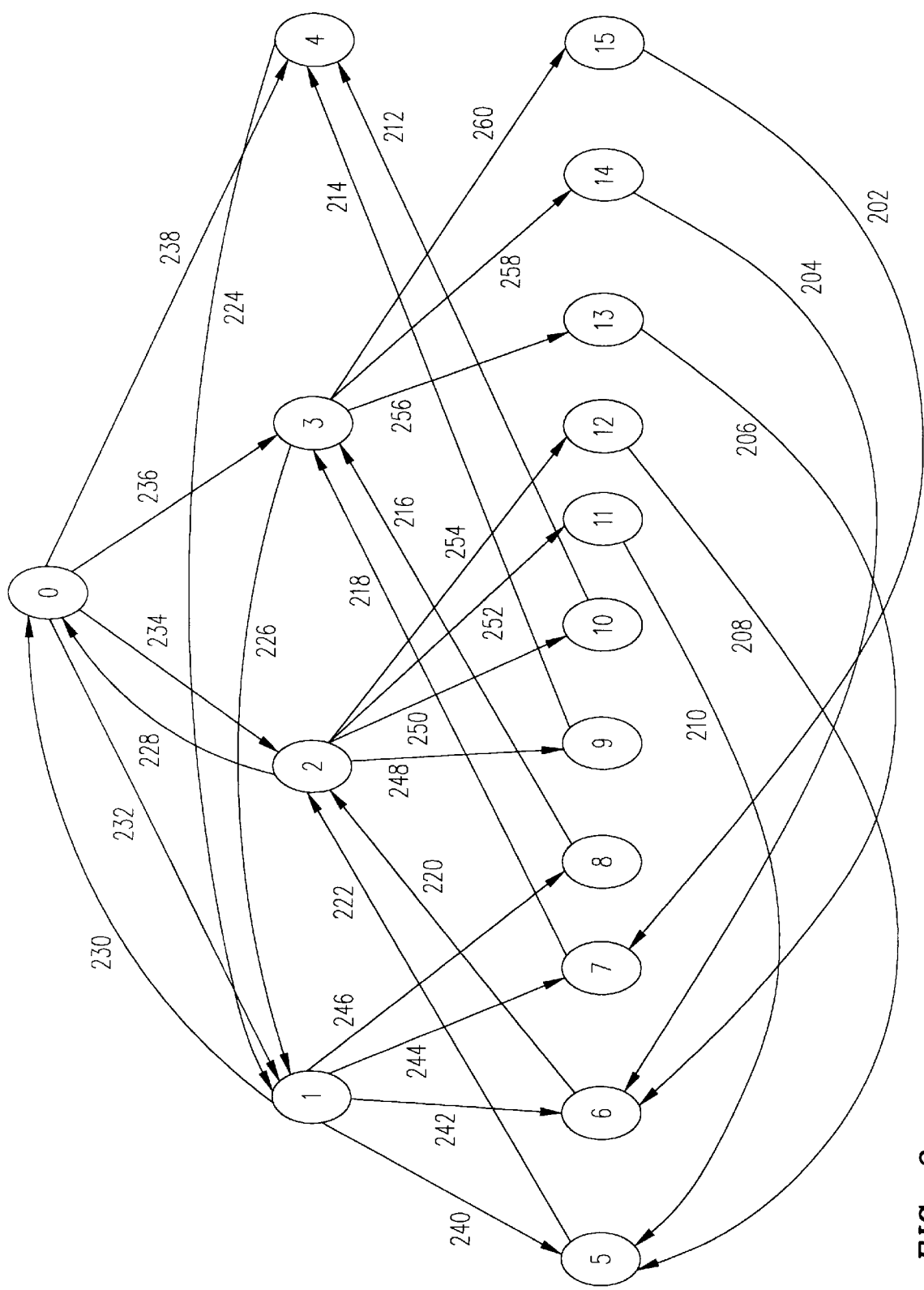
FIG. 2 illustrates a reduction tree skeleton in accordance with the present invention.

The reduction computation pattern skeleton or reduction skeleton comprises a fan-in tree and a fan-out tree. An exemplary reduction skeleton 200 is illustrated in FIG. 2. The fan-in tree has N nodes (N=16 for reduction skeleton 200), where N is the number of threads in the rope, the rope being a group of threads, each thread in the rope performing the same computation, but on possibly different data components. Each node of the reduction skeleton fan-in tree is identified by a distinct thread index (0 to N−1). During a fan-in reduction computation, the reduction operation takes place in a bottom up fashion, starting at the leaf nodes of the fan-in tree and going to the root node of the fan-in tree. At the end of the fan-in reduction computation, the root node has the reduced value.

The fan-in tree of reduction skeleton 200 has sixteen nodes {0, 1, 2, 3, 4, 5, 6, 7, 8, 9, 10, 11, 12, 13, 14, 15} corresponding to sixteen threads performing a reduction computation, and fifteen fan-in communication edges {202, 204, 206, 208, 210, 212, 214, 216, 218, 220, 222, 224, 226, 228, 230} between the nodes comprising a five level fan-in tree structure. A first level of fan-in trees comprises node 15 fanning in to node 7 through communication edge 202. A second level fan-in tree comprises node 14 and node 13 fanning in to node 6 through communication edges 204 and 206, node 12 and node 11 fanning in to node 5 through communication edges 208 and 210, node 10 and node 9 fanning in to node 4 through communication edges 212 and 214, and node 8 and node 7 fanning in to node 3 through communication edges 216 and 218. A third level fan-in tree comprises node 6 and node 5 fanning in to node 2 through communication edges 220 and 222, and node 4 and node 3 fanning in to node 1 through communication edges 224 and 226 A fourth level of fan-in trees comprises node 2 node 1 fanning into node 0 through communication edges 228 and 230. Thus it can be appreciated that the present invention provides a multi-level fan-in tree structure for a reduction operation beyond the single level tree structures provided by the prior art for reduction operations.

The fan-out tree of the reduction skeleton also has N nodes, and these fan-out nodes are identified by thread indices. The fan-out phase of the reduction computation is a broadcast phase where the reduced values are broadcast to each individual thread in a top-down fashion, starting at the root node and going to the leaf nodes.

The fan-out tree of reduction skeleton 200 also has sixteen nodes {0, 1, 2, 3, 4, 5, 6, 7, 8, 9, 10, 11, 12, 13, 14, 15} corresponding to sixteen threads performing a reduction computation, and fifteen fan-out communication edges {232, 234, 236, 238, 240, 242, 244, 246, 248, 250, 252, 254, 256, 258, 260} between the nodes comprising only a three level fan-out tree structure. A first level of fan-out tree comprises node 0 fanning out to node 1, node 2, node 3, and node 4 through communication edges 232, 234, 236, and 238. A second level of fan-out trees comprises node 1 fanning out to node 5, node 6, node 7, and node 8 through communicaiton edges 240, 242, 244, and 246; node 2 fanning out to node 9, node 10, node 11, and node 12 through communication edges 248, 250, 252, and 254; and node 3 fanning out to node 13, node 14, and node 15 through communication edges 256, 258, and 260. Thus it can be appreciated that the present invention provides a multi-level fan-out tree structure for a reduction operation beyond the single level tree structures provided by the prior art for reduction operations. By comparison of the four-level fan-in tree and the three-level fan-out tree, it may be further appreciated that the present invention provides a reduction tree skeleton in which the fan-in tree and fan-out trees may be different, varying by both levels and configurations.

Alternatively, the reduction skeleton may be regarded as a single tree with N nodes, where only the traversals specified by fan-in phase and fan-out phase are different.

Reduction Tree Class

The reduction skeleton 200 is defined by a reduction tree class, as illustrated in FIG. 3, which is parametrized so that it will work for any tree which is unary to (N−1)-ary, and also so that the fan-in and the fan-out trees (or traversals) may be of different ranks, i.e., the fan-in tree may be binary and the fan-out tree may be quarternary. The reduction tree class 300 definition of FIG. 3 is implemented in C++; however, those skilled in the art recognize that the reduction tree class 300 definition may be implemented in other programming languages. For convenience, this reduction tree class 300 is also listed below:

```
class FanInNode {
        public:
                typedef short fanin_size_type;
                enum {fanin_size = sizeof(fanin_size_type) };
                Boolean ith_fanin_child_exists(const int i) const;
};
class FanOutNode {
        public:
                typedef int fanout_size_type;
                enum {fanout_size_type;
                Boolean ith_fanout_child_exists(const int i) const;
};
class Reduction {
        public;
                struct FanInOutNode : public FanInNode,
                public FanOutNode {
                  . . .
                };
                typedef FanInOutNode node_type;
                Reduction(const int size); // constructor
                virtual ~Reduction(); // destructor
                int Size() const; //number of threads participating in a reduction
                node_type& get_node(const int I0; // get node of the i^th thread
                static int fanin_parent(const int i);
                //get the fan-in parent of the i^th thread
                static int fanout_parent(const int i);
                //get the fan-out parent of the i^th thread
                static int fanout_child(const int i, const int k);
                //get the k^th fan-out child of i^th thread
                static int fanin_child(const int i, const int k);
                //get the k^th fan-in child of i^th thread
                private:
                        node_type * nodes;
                        int_size;
                        const int STAGGER_FACTOR = 128;
};
```

The class FanInNode 305 defines the fan-in node properties such as a type fanin_size_type 310. For a fan-in size of k this is a C++ data type whose size (as given by the C++ size of operator 315) is k bytes. For instance, the code defines fanin_size_type 310 to be a short to specify a fan-in size of 2 (given by the field fanin_size 320), since short is 2 bytes in many implementations. This class also defines a boolean query member function 325, which when given the index i 330 says whether or not it has an ith child (note that any node in the fan-in tree has at most fanin_size children.

The class FanOutNode 335 defines the fan-out node properties. It defines a type fanout_size_type 340. For a fan-out size of k this is a C++ data type whose size (as given by the C++ size of operator 315) is k bytes. For instance, the code defines fanout_size_type 340 to be an int to specify a fan-out size of 4 (given by the field fanout_size 345), since int is 4 bytes in many implementations. This class also defines a boolean query member function 350, which when given the index i 355 says whether or not it has an ith child (note that any node in the fan-out tree has at most fanout_size children.

The class Reduction 360 defines the reduction skeleton. It defines a class MyNode 365 to define the type of a reduction node (given by node_type 370) which combines the properties of the FanInNode 305 and FanOutNode 335 classes. The constructor 375 of this class takes in one parameter 380 which is the size of the reduction tree (number of threads that may participate in a reduction operation). The class Reduction 360 builds the reduction tree skeleton based on the fanin and fanout sizes, and defines the following member functions:

size( ) member function 382 which gets a rope size or number of threads participating;

get_node(const int i) member function 384 which gets a node corresponding to the thread with index i;

fanin_parent(const int i) member function 386 which gets an index of a thread corresponding to a fanin parent node of the node which corresponds to the thread with index i;

fanout_parent(const int i) member function 388 which gets an index of a thread corresponding to a fanout parent node of the node which corresponds to the thread with index i;

fanout_child(const int i, const int k) member function 390 which gets the kth fan-out child of ith thread; and fanin_child(const int i, const int k) member function 392 which gets a kth fanin child node of the node which corresponds to the thread with index i.

A FanInNode object may have at least zero and at most fanin_size children nodes. For example, the skeleton of FIG. 2 has a fanin_size of two where node 0 has two (fanin_size) children nodes and nodes 8 through 15 have zero children nodes. The function ith_fanin_child_exists (const int i) 325 is used in the reduction operation to check if a node has an ith child. Similarly a FanOutNode object may have at least zero and at most fanout_size children nodes. For example, the skeleton of FIG. 2 has a fanout_size of four where node 0 has four (fanout_size) children nodes and nodes 5 through 15 have zero children nodes. The function ith_fanout_child_exists(const int i) 350 is used in the reduction operation to check if a node has an ith child.

The FanInNode also has fields 970 which are set by the threads corresponding to its children nodes when they arrive at the synchronization point. During the fan-in phase of the reduction, the thread corresponding to this node waits for these fields to be set, i.e., waits for its children threads to arrive, and performs the part of the reduction operation corresponding to this node.

The FanOutNode object also has fields 980, including a boolean field which is set by the threads corresponding to its parent node. The threads corresponding to the fan-out children nodes wait for their parent thread to set its field to indicate that it has arrived at the fan-out synchronization point. Once the parent has arrived, the reduced value is available for the threads waiting at the children nodes for use, and they can leave the reduction synchronization. Between two different reduction operations the boolean field is flipped (i.e., if it is set to true for a reduction operation, then it is set to false for the next one, and then again to true for the one following that, and so on). This ensures that different reduction operations involving the same set of threads do not interfere with each other.

The Reduction class defines the reduction skeleton template. It defines a node type FanInOutNode. FanInOutNode is multiple inherited from FanInNode and FanOutNode. Thus each node in the reduction tree has both fan-in and fan-out properties (described above). For a reduction tree with N nodes, an array 920 of N FanInOutNode type objects 960 are stored in the Reduction object.

The reduction tree is implemented as follows: For a tree with N nodes (corresponding to N threads, the reduction object consists of an array 920 (of size N) of FanInOutNode type objects 960. This array is allocated in the Reduction constructor. The array is released in the destructor. If two different threads access two adjacent nodes in this array, false sharing and memory contention may be caused. To avoid false sharing and to obtain cache optimization, a much larger array may be used. For instance, for N nodes, an array of N*STAGGER_FACTOR may be used, where STAGGER_FACTOR 396 is used to stagger access of this array and reduce false sharing and data contention.

Figure 9:
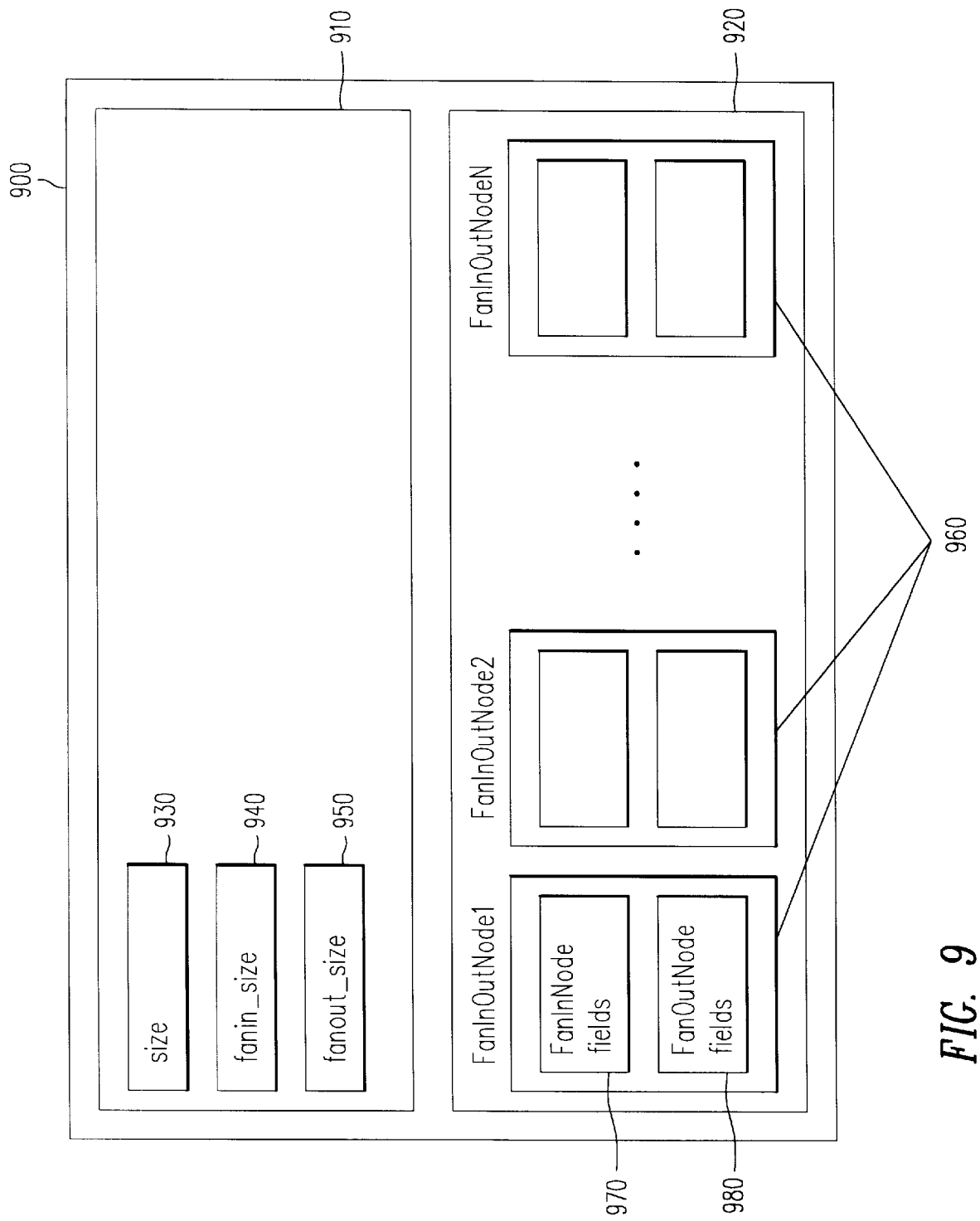
FIG. 9 illustrates a data structure in accordance with the present invention.

An exemplary data structure 900 for storing and accessing the information contained in the reduction object is illustrated in FIG. 9. This data structure 900 contains both reduction tree specific information 910 and node specific information data 920. The reduction tree specific information 910 may include information such as size 930, fanin_size 940, and fanout_size 950 which define aspects of the entire reduction tree. The node specific information contained in N FanInOutNode elements 960 may include information such as the FanInNode fields 970 and the FanOut-Node fields 980 which define aspects of a particular node within the reduction tree.

The different member functions of the Reduction class 300 may be implemented as follows:

The constructor, based upon its size argument, allocates an array of type node_type into the nodes field. This array is of size size*STAGGER_FACTOR. The memory is released in the destructor of the Reduction object.

The function get_node(const int i) returns nodes [i*STAGGER_FACTOR].

The function fanin_parent(const int i), which returns the index of the fanin_parent thread of the ith thread, basically returns (i−1)/node type::fanin_size. Similarly fanout_parent(const int i) returns (i−1)/node type::fanout_size.

The function fanin_child(const int i, const int k) returns the index of the kth child of the ith thread. This can be implemented as returning node_type::fanin_size*i+k+1. Similarly fanout_child(const int i, const int k) can be implemented as returning node_type::fanout_size*i+k+1.

In this performance oriented preferred embodiment, the functions fanin_parent, fanout_parent, fanin_child, fanout_child do just index manipulations and do not need the reduction object for computation; hence they are declared to be static. In alternative embodiments oriented towards non-performance objectives such as flexible dynamic reduction tree skeletons, they may be declared to be dynamic and these functions may access the data structure in lieu of calculations. In such alternative embodiments, the data structure may also be expressed as other data structures such as lists or linked lists in lieu of fields.

Sample Reduction Operation

Consider a part of sum reduction operation with 16 threads with a fan-in size of 2, and fan-out size of 4 (see FIG. 2). Assume that each thread contributes a value which is equal to its own index for the reduction. Consider the fan-in operation at node 1. The thread with index 1 waits for all its children (i.e., threads 3 and 4) to arrive at the fan-in. Thread 3 brings in a part-reduced value of 33 (obtained by adding 3 to the values 22 and 8 contributed by its fan-in children threads 7 and 8). Similarly, thread 4 contributes a value of 23. A local reduction operation takes place at node 1, and 1 is added to 23 and 33 to obtain 57. Threads 3 and 4 meanwhile wait at the fan-out synchronization point. After this partial reduction, thread 1 arrives at the reduction point of its parent, i.e., thread 1 then waits at the fan-out synchronization for its parent thread 0 to provide a reduced value. Thread 0 waits for thread 2 also to arrive and performs a local reduction. It has values 57 (contributed by 1) and 63 (contributed by 2). The final reduction sum is 0+57+63=120. Thread 0 being the root of the tree has no fan-in parent, and so has the final reduced value 120 which it is ready to broadcast back to its children. It arrives at the fan-out synchronization point with the value waking up its fan-out children 1, 2, 3 and 4 (if they have already arrived there). When these threads have the reduced value, they arrive at the fan-out synchronization point of their children, broadcasting the reduced value to them. This operation proceeds until the reduced value is broadcast to all the threads.

Type-specific Reduction

Figures 4, 5:
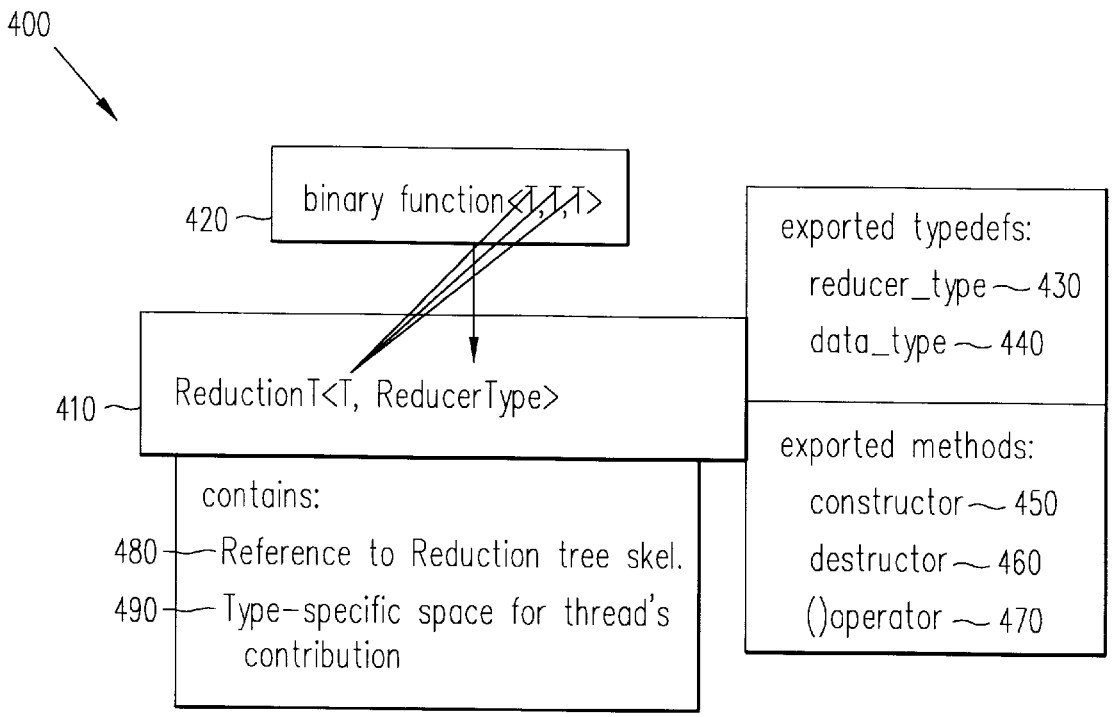
FIG. 4 illustrates an inheritance hierarchy diagram of a type-specific reduction template class in accordance with the present invention.
FIG. 5 illustrates a type-specific reduction template class in accordance with the present invention.

In a data-parallel operation involving N threads of a rope, the threads may participate in a type-specific reduction. To achieve this type-specific reduction, the present invention defines a type-specific reduction template class, ReductionT template class, parameterized on the type of the value that the threads contribute to a reduction operation. Referring next to FIG. 4, a type-specific reduction template class inheritance hierarchy diagram 400 is illustrated. The type-specific reduction template class 410 inherits from a template class of the reduction operation 420, which may be the template class of a binary function. The type-specific reduction template class 410 exports two typedefs: reducer_type 430 and data_type 440. The type-specific reduction template class 410 also exports operators: constructor 450, destructor 460, and operator ( ) 470. The type-specific reduction template class 410 contains a reference to the reduction tree skeleton 480 and a type-specific space 490 for a thread's contribution to the reduction operation.

Referring next to FIG. 5, a type-specific reduction template class 500 definition in C++ is illustrated. For convenience, this type-specific reduction template class 500 is also listed below:

```
template <class T, class ReducerType : binary_function<T, T, T> >
class ReductionT {
public:
        typedef ReducerType reducer_type;
        typedef T data_type;
        ReductionT(Reduction& my_red =
        Rope::SelfRope().ReductionObj());
        ~ReductionT();
        T operator()(reducer_type reducer, const T& data);
};
```

In the type-specific reduction template class 500, Reducer Type 505 is a type of a binary function object 510 which expects two arguments 515 of type convertible to type T, and whose result type 520 is a type convertible to type T The constructor 525 expects a Reduction object 530 as an argument which is typically Rope::SelfRope( ).ReductionObj( ). The class also exports a type called reducer_type 535 which is the same as the actual argument for the template parameter ReducerType 505, and a type data type 540 which is basically type T The ( ) operator 545 takes two arguments: a reducer 550 which is a binary commutative and associative function object that is used in the reduction, and data 555 which is the contribution of a thread invoking a reduction to the reduction operation. The ( ) operator 545 performs the actual reduction with each thread of the rope participating in the reduction operation invoking the ( )

operator 545 while in a data-parallel computation. All the threads participating in the reduction operation specify the same reducer_type 550 argument, and making this a part of the ( ) operator 545 allows the reuse of the same reduction object for different reduction operations.

Figure 6:
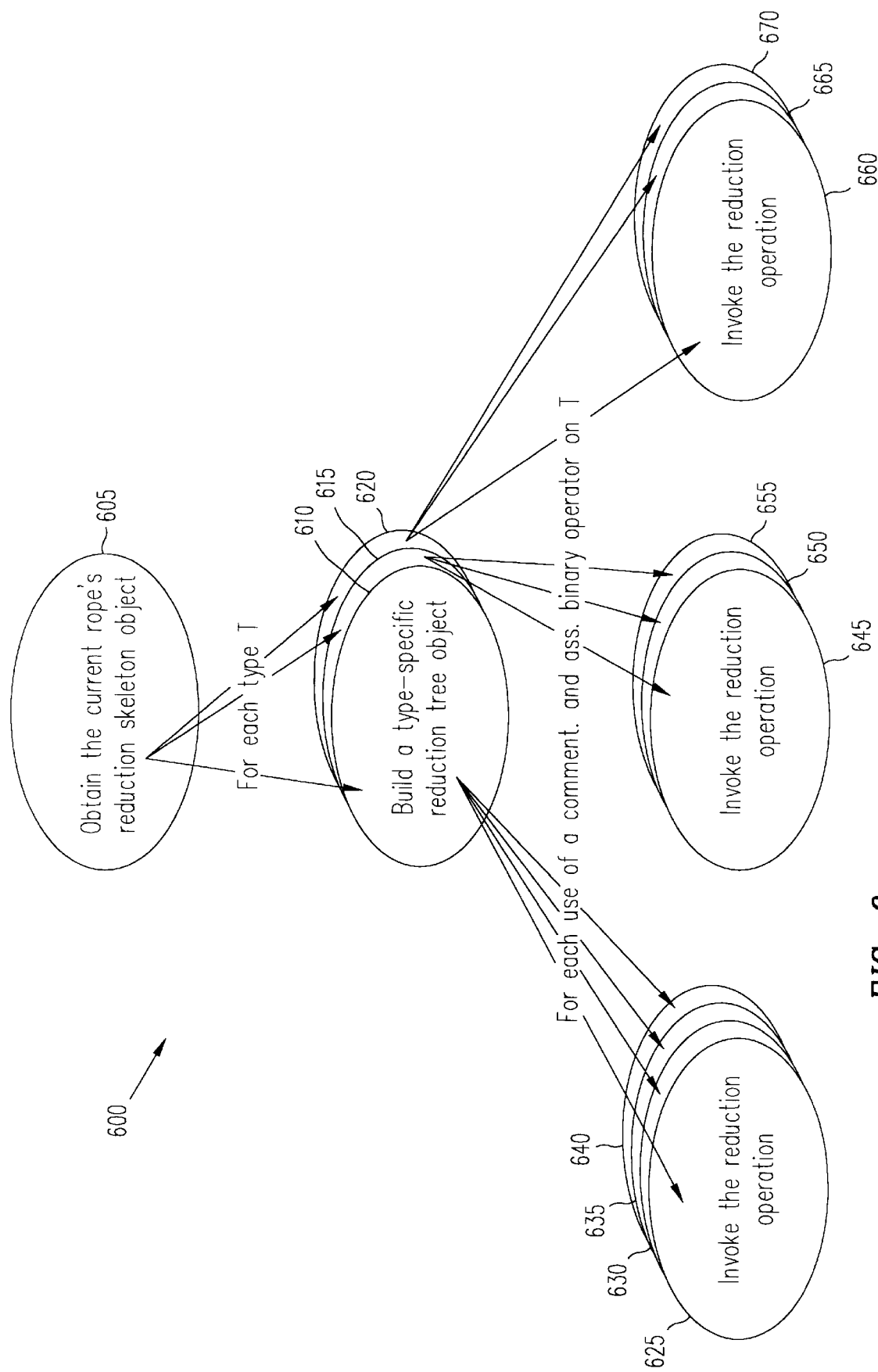
FIG. 6 illustrates a parallel execution graph of a type-specific reduction in accordance with the present invention.

Referring now to FIG. 6, a parallel execution graph 600 of a group of parallel reduction operations is illustrated to more fully appreciate the benefits and advantages of the present invention. In this example, ten parallel reduction operations are performed on three different data types according to the same reduction tree skeleton. To perform these parallel reduction operations by use of the present invention, a member of the reduction template class causes each thread, of a rope comprising a group of threads, participating in the reduction operation to obtain the reduction tree skeleton object corresponding to the thread's rope, as illustrated by node 605. Then for each type T for which the reduction operation is to be performed, the thread creates a type-specific per-thread reduction object. Thus node 610 creates a first type-specific per-thread reduction object for a first data type T (i.e., integer); node 615 creates a second type-specific per-thread reduction object for a second data type T (i.e., float); and node 620 creates a third type-specific per-thread reduction object for a third data type T (i.e., boolean). Then for each reducer (binary commutative and associative operator for type T) within one of the three type-specific per-thread reduction objects, the '( )' member operator of the type-specific per-thread reduction object is invoked in order to invoke a reduction of that reducer type on that data type according to that reduction skeleton. Thus, for the first type-specific per-thread reduction object created by node 610 for a first integer data type T, four reduction operations are invoked to use the same cloned reduction skeleton for that integer data type for the four different reduction operations. These different reduction operations may include, for example: an integer summation reduction 625, an integer product reduction 630, an integer minimum reduction 635, and an integer maximum reduction 640. For the second type-specific per-thread reduction object created by node 615 for the second float data type T, three reduction operations are invoked to use the same cloned reduction skeleton for that float data type for the three different reduction operations. These different reduction operation may include, for example: a float summation reduction 645, a float product reduction 650, and a float minimum reduction 655. Similarly, for the third type-specific per-thread reduction object created by node 620 for the third boolean data type T, three reduction operations are invoked to use the same cloned reduction skeleton for that boolean data type for the three different reduction operations which may include, for example: a boolean OR reduction 660, a boolean EXCLUSIVE OR reduction 665, and a boolean AND reduction 670. Thus it may be appreciated how the present invention provides both a data type independent and a reducer type independent reduction skeleton.

Example User Code Using Use Reduction Objects

Figures 7, 8:
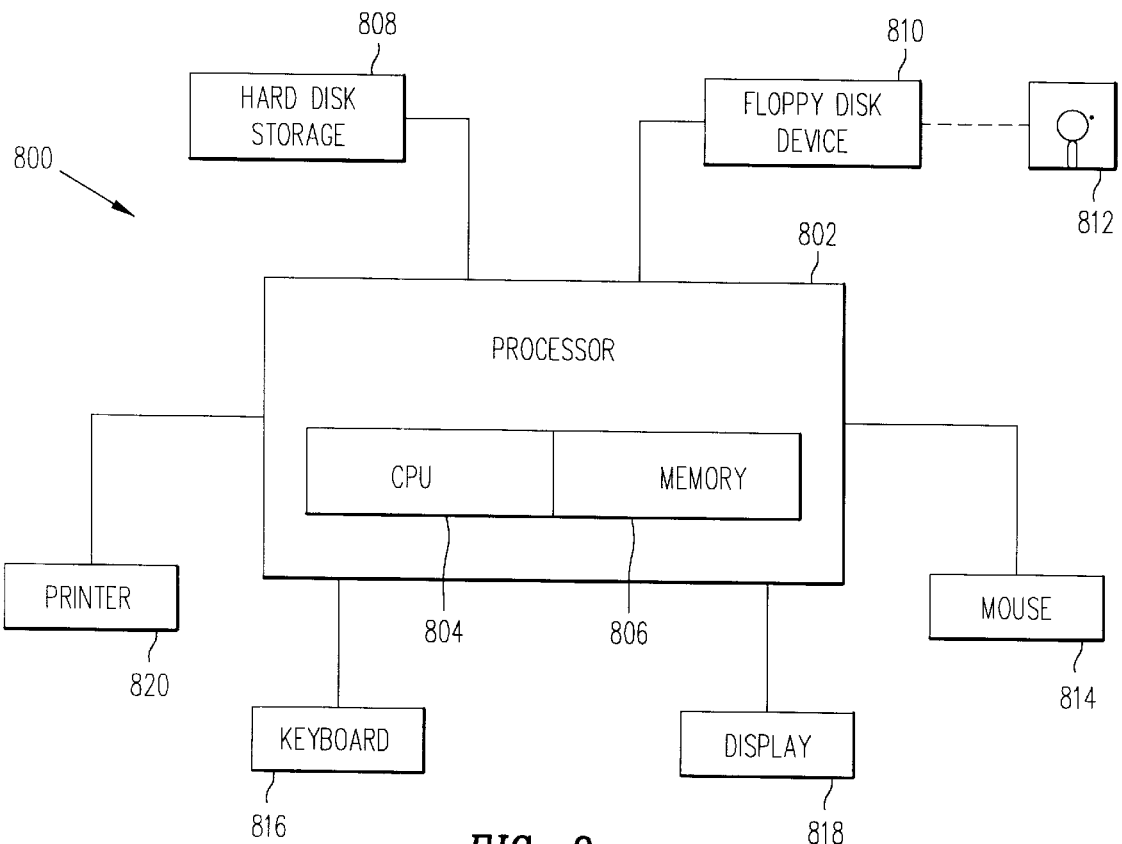
FIG. 7 illustrates example user code in accordance with the present invention.
FIG. 8 is a block diagram of a computer system used in performing the method of the present invention, forming part of the apparatus of the present invention, and which may use the article of manufacture comprising a computer-readable storage medium having a computer program embodied in said medium which may cause the computer system to practice the present invention.

The following user program code example 700, also illustrated in FIG. 7, shows the use of the present invention to perform reduction operations:

```
...
ReductionT<int, binary_function<int, int, int> >
red_obj(Rope::SelfRope().ReductionObj());
int my_contrib = . . .
int my_sum = red_obj(plus<int>, my_contrib); // sum reduction
int my_proid = red_obj(times<int>, my_contrib); // product reduction
...
```

If there are N threads in a rope participating in a data-parallel operation performing a sum reduction followed by a product reduction on integer types, then each thread executes the user program code 700 causing each thread to do the following:
  obtain the reduction tree skeleton object corresponding to this thread's rope;
  for each type T for which the reduction operation is to be performed, create a type-specific per-thread reduction object; and
  for each reducer (binary commutative and associative operator for type T), invoke the '( )' operator of the ReductionT object.

Referring now to FIG. 8, a block diagram illustrates a computer system 800 used in performing the method of the present invention, forming part of the apparatus of the present invention, and which may use the article of manufacture comprising a computer-readable storage medium having a computer program embodied in said medium which may cause the computer system to practice the present invention. The computer system 800 includes a processor 802, which includes a central processing unit (CPU) 804, and a memory 806. Additional memory, in the form of a hard disk file storage 808 and a computer-readable storage device 810, is connected to the processor 802. Computer-readable storage device 810 receives a computer-readable storage medium 812 having a computer program embodied in said medium which may cause the computer system to implement the present invention in the computer system 800. The computer system 800 includes user interface hardware, including a mouse 814 and a keyboard 816 for allowing user input to the processor 802 and a display 818 for presenting visual data to the user. The computer system may also include a printer 820.

Although the present invention has been particularly shown and described with reference to a preferred embodiment, it will be understood by those skilled in the art that various changes in form and detail may be made without departing from the spirit and the scope of the invention.

I claim:

1. A data structure stored in a memory of a computer system for representing a reduction computation pattern for a reduction operation performable by the computer system, the reduction computation pattern having a size N and comprising N nodes stored in the memory of the computer system, the N nodes corresponding to N threads comprising a group of threads performing a same computation on possibly different data components, the data structure comprising:
  a first data structure defining a fan-in tree computation pattern, the first data structure comprising:
    a fan-in size field stored in the memory of the computer system, said fan-in size field storing a size, fan-in size, of the fan-in tree computation pattern, and
    a Fan-In Node object having at least zero and at most fan-in size children nodes, the Fan-In Node object comprising a plurality of fields wherein each of the fields corresponds to one of the children nodes of the Fan-In Node object and wherein each of the fields stores in the memory of the computer system an indication of whether a thread, corresponding to the field and its corresponding child node, has arrived at a fan-in synchronization point; and a second data structure defining a fan-out tree computation pattern, wherein a rank and configuration of the fan-out tree computation pattern is different from a rank and configuration of the fan-in tree computation pattern.

2. The data structure of claim 1 wherein the second data structure further comprises a fan-out size field stored in the memory of the computer system, said fan-out size field storing a size, fanout size, of the fan-out tree computation pattern.

3. The data structure of claim 2 wherein the second data structure further comprises a FanOutNode object having at least zero and at most fanout size children nodes.

4. The data structure of claim 3 wherein the FanInNode object further comprises a field corresponding to a parent node of the FanOutNode object and wherein the field stores in the memory of the computer system an indication of whether a thread corresponding to the parent node has arrived at a fan-out synchonization point.

5. The data structure of claim 1 wherein the data structure is multiple-inherited from the first data structure defining the fan-in tree computation pattern and the second data structure defining the fan-out tree computation pattern, and wherein the data structure comprises a plurality of nodes, each of said nodes inheriting fan-in properties from the first data structure and fan-out properties from the second data structure.

6. The data structure of claim 5 wherein the data structure is implemented as an object oriented class.

* * * * *